United States Patent
Kim

(10) Patent No.: US 6,220,045 B1
(45) Date of Patent: Apr. 24, 2001

(54) APPARATUS AND METHOD FOR CONTROLLING RESONANCE FREQUENCY OF INVERTER REFRIGERATOR

(75) Inventor: Yong Tae Kim, Changwon (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/448,287

(22) Filed: Nov. 24, 1999

(30) Foreign Application Priority Data

Nov. 28, 1998 (KR) .................................. 98-51561

(51) Int. Cl.⁷ ...................................................... F25B 49/02
(52) U.S. Cl. ............................................. 62/228.4; 62/229
(58) Field of Search ................................. 62/229, 228.4, 62/230, 296, 228.1, 215

(56) References Cited

U.S. PATENT DOCUMENTS

| | | | |
|---|---|---|---|
| 5,203,178 | * 4/1993 | Shyu | 62/296 X |
| 5,605,053 | * 2/1997 | Otori | 62/228.4 X |
| 5,655,380 | * 8/1997 | Calton | 62/228.4 X |
| 5,771,704 | * 6/1998 | Nakajima et al. | 62/228.4 |

* cited by examiner

*Primary Examiner*—Harry B. Tanner
(74) *Attorney, Agent, or Firm*—Fleshner & Kim, LLP

(57) ABSTRACT

The present invention relates to an apparatus and method for controlling the operating speed of a compressor of an inverter refrigerator. In an apparatus or method embodying the present invention, one knows the operating speeds which will cause the compressor to experience resonant vibrations. When it is necessary to change from a first operating frequency to a second operating frequency, and a resonant frequency band is located between the first and second frequencies, the controller will accelerate the rate of change of the operating frequency as it passes through the resonant frequency band to minimize the amount of time that the compressor is operating within the resonant frequency band.

18 Claims, 4 Drawing Sheets

APPARATUS AND METHOD FOR CONTROLLING RESONANCE FREQUENCY OF INVERTER REFRIGERATOR

BACKGROUND OF THE INVENTION

1. Field of the Invention

The present invention relates to an apparatus and method for controlling a resonance frequency of an inverter refrigerator and, in particular, to an apparatus and method for controlling a resonant frequency of an inverter refrigerator whereby, in a compressor of an inverter refrigerator, when a current rotation frequency is converted to a target rotation frequency in the rotor detecting operation mode, an operation of the compressor is implemented in a frequency band higher or lower than a resonance frequency band.

2. Description of the Conventional Art

An inverter refrigerator rectifies a frequency(60 Hz) of an AC power source by a direct current and changes a supplied frequency(PWM) at the same time, whereby a rotation frequency of a compressor motor is adjusted and the amount of coolant compressed according to the adjusted frequency is controlled. Thus, in the case that there is much food in a refrigerator which food must be stored at a lower temperature as shown in FIG. 1, that is, in the case that the temperature in the refrigerator is higher than a set temperature, the rotation speed of a compressor is increased (usually, at a rotation frequency of higher than 60 Hz) for thereby taking much quantity of heat away. In the case that the amount of food is small or there is no food, that is, the temperature detected in the refrigerator is the same as the set temperature or is lower than the set temperature, the operation is performed at a lower speed(usually, at a speed of higher than 60 Hz) so that a small quantity of heat can be taken away from the foods, thereby reducing the energy consumed for compressing an unnecessary coolant.

The operation control of the compressor motor of the inverter refrigerator for performing the operation described above can be divided into three segments. As shown in FIG. 3, a first segment is an initial positioning mode for setting the rotor to a regular phase all the time by providing an electric current before starting the operation, a second segment is a synchronous operation mode for forcibly applying a current corresponding to a set starting torque, thereby accelerating the motor, because the initial rotation frequency of the motor is low and thus an induced electromotive force cannot be sensed, and a third segment is a rotor detecting operation mode for distributing a current appropriate for each phase of a stator according to a position information generated by an induced electromotive force and controlling the same when enough induced electromotive force can be detected based on an increased rotation frequency of the motor.

FIG. 2 is an example of a rotor position sensor of a conventional inverter refrigerator. The description thereof will be provided as follows.

There are two kinds of rotor position sensors; one is a hall sensor, and the other is a sensorless type. In a conventional inventor refrigerator motor, a stator 220 has an extra hall element for sensing an electric magnetic field when a magnet of a rotor 210 approaches the extra hall element. At present, the sensorless type is being generally used, considering a high pressure and current leakage in the compressor. The sensing principle thereof is that as a permanent magnet of the rotor is rotated near a coil wound on the stator 220, an induced electromotive force is generated at the coil based on the operation of an electric generator, thereby detecting the position of the rotor 210. In this way, the position of the rotor 210 is detected, whereby the current is flown to two phases(AB-BC-CA) of three phases(A, B, C) for sensing the induced electromotive force and supplying power, thus generating a rotation force, so that the rotor 210 is rotated.

FIG. 3 is a graph showing a frequency characteristic in the operation control mode of a compressor of a conventional inverter refrigerator. As shown in FIG. 2, the rotor 210 has a certain phase obtained by applying a current to three phases of the stator 220, respectively, for a certain time before starting the motor. The rotor is operated at the same phase for thereby obtaining a certain rotation. The above described operation is called as an initial positioning mode.

Thereafter, by selecting a starting pattern(a certain voltage and current), which is capable of generating a certain starting torque among a plurality of starting patterns according to the power voltage supplied when a start-up command signal is outputted to a semiconductor switching element having a certain phase, a current corresponding to the starting torque is supplied to thereby start the motor. Before performing the above starting operation, the rotor 210 must always be located at a certain position in the stator 210. The rotor 210 is located at a certain position based on an electric magnetic field formed by supplying a current corresponding to a certain phase of the stator. When the start-up operation is thusly prepared, a starting current is supplied for thereby driving the motor, so that the motor is operated in the synchronous operation mode.

Next, the rotor detecting operation mode will be described as follows referring to FIG. 4.

As shown in FIG. 3, when a transition segment is passed over, the position of the rotor is detected by a position detector 410 based on the induced electromotive force. The thusly detected position is outputted to a rotation frequency detector 440 to detect a rotation frequency. Then, the interior temperature of the refrigerator is judged by a set rotation frequency command unit 430 for thereby determining whether the rotor is operated at a lower RPM or a higher RPM. The current ratio supplied to each phase is differently set using a duty setting unit 450 according to a result of the determination. Six semiconductor switching elements each connected to a corresponding phase by a chopping signal generator 460 are controlled to thereby control the RPM of the compressor motor at a certain frequency.

In the above described conventional art, there is a problem that, as shown in FIG. 5, when an operating frequency passes through a frequency band in which a resonance occurs at the compressor or when the operating frequency is set in a resonance frequency band, the operating frequency is resonated, so that strong noises and vibrations occur.

SUMMARY OF THE INVENTION

Accordingly, it is an object of the present invention to provide an apparatus and method for implementing an operation of an inverter refrigerator in a higher or lower frequency band than a resonance frequency band when the current rotation frequency is converted to a target rotation frequency in the rotor detecting operation mode.

To achieve the above object, a resonance frequency controller of an inverter refrigerator of the present invention includes: a temperature sensing unit for sensing an interior temperature of a refrigerator; a desired operating frequency determination unit for determining the desired operating frequency by checking the state of the refrigerator based on the temperature sensed in the above temperature sensing unit; an initial operating frequency setting unit for setting a first operating frequency during an initial start-up of a compressor; a resonance band judgement unit for judging whether a set resonance frequency band(hereinafter, called as a "resonance band") exists between the operating frequency and the initial operating frequency, which are inputted from the desired operating frequency determination unit and the initial operating frequency setting unit; an operating frequency control unit for varying the operating frequency determined by the desired operating frequency determination unit according to a result of the determination by the resonance band judgement unit and outputting the varied operating frequency; and a compressor driving unit for driving the compressor in accordance with the operating frequency outputted from the operating frequency control unit.

The operating frequency control unit includes a variable speed setting unit for deviating the operating frequency from the resonance band by varying the rate of speed increase to a certain rate of increase when the operating frequency is in the resonance band.

To achieve the above object, there is provided a method for controlling a resonance frequency of an inverter refrigerator of the present invention which includes: setting a first operating frequency($f_0$) during an initial start-up and a resonance frequency($f_{r1}$); checking an interior temperature of the refrigerator; determining the desired operating frequency($f_c$) according to the interior temperature judging whether a resonance frequency exists between the first operating frequency($f_0$) during the initial start-up and the desired operating frequency($f_c$); varying the rate of change of the operating frequency if the operating frequency passes through a resonance frequency band; and driving the compressor in accordance with the operating frequency if the operating frequency does not pass through a resonance frequency band.

In the first step, the operating frequency during the initial start-up is set to a frequency deviated from the resonance frequency band.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
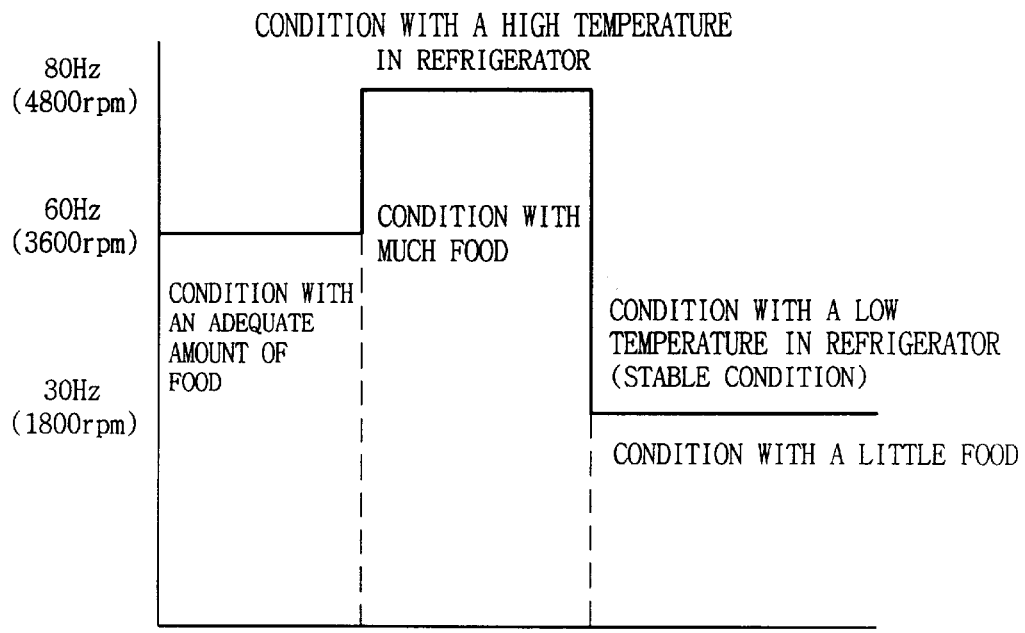
FIG. 1 is an illustrative view showing a rotor frequency of a compressor according to the amount of food in a conventional inverter refrigerator.
Figure 2:
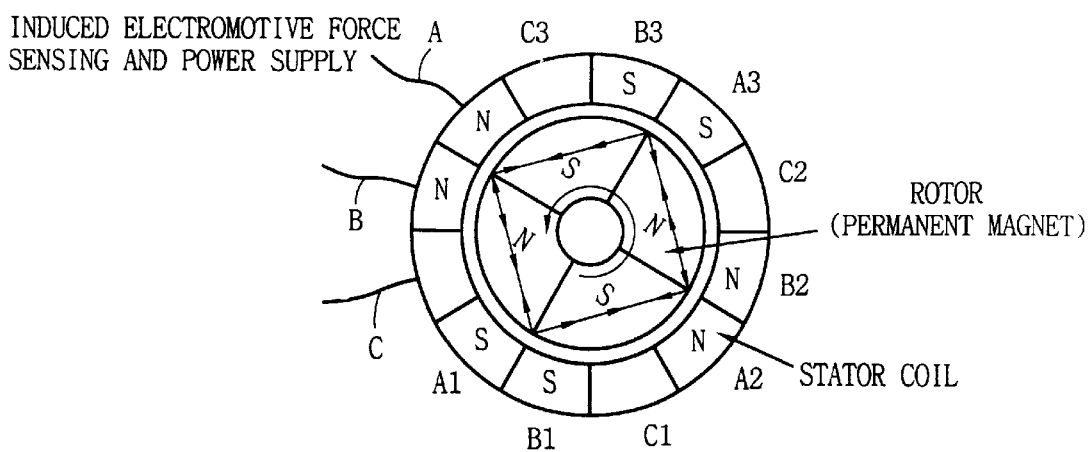
FIG. 2 is a view showing an example of a rotor position sensor of a conventional inverter refrigerator.
Figure 3:
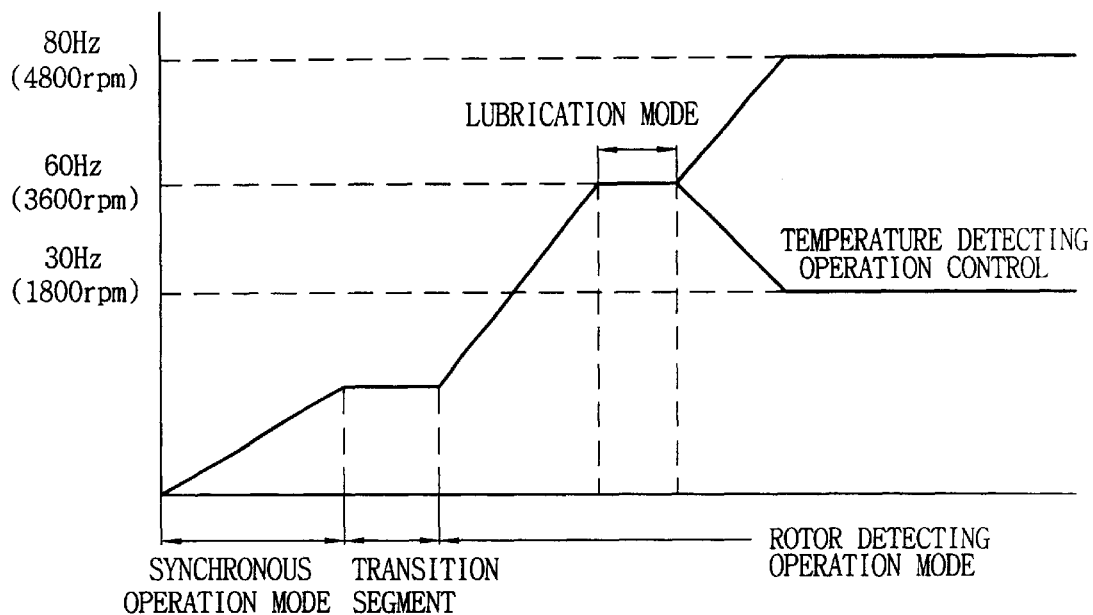
FIG. 3 is a view showing a frequency characteristic in the compressor operation control mode of a conventional inverter refrigerator.
Figure 4:
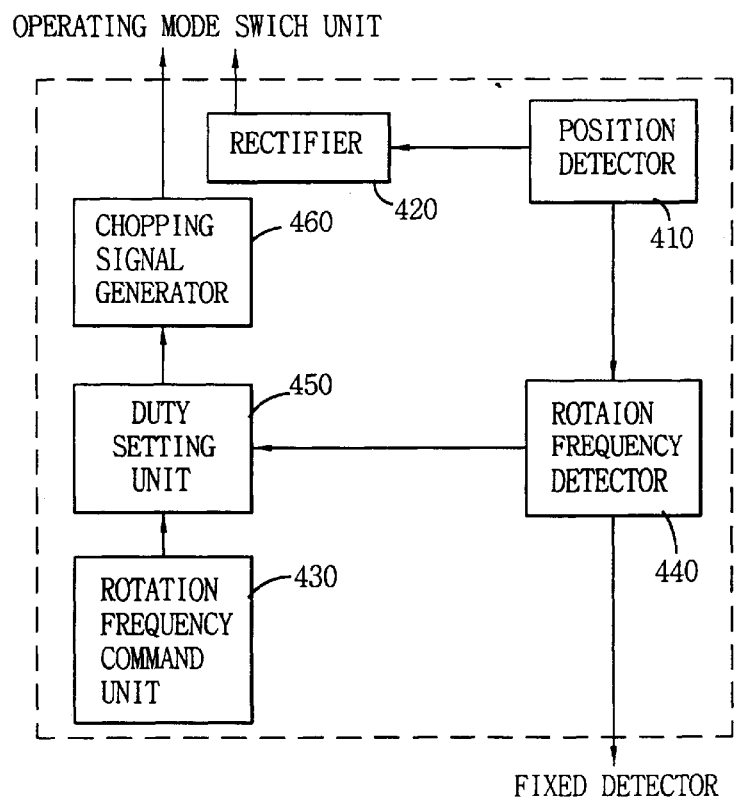
FIG. 4 is a view showing an example of an operation control block of a conventional inverter refrigerator.
Figure 5:
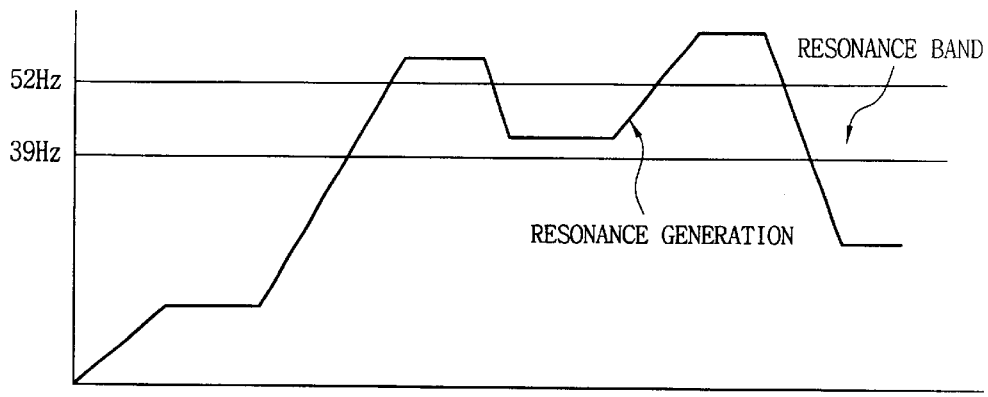
FIG. 5 is an illustrative view showing a resonance occurred in the resonance frequency band of FIG. 3.
Figure 6:
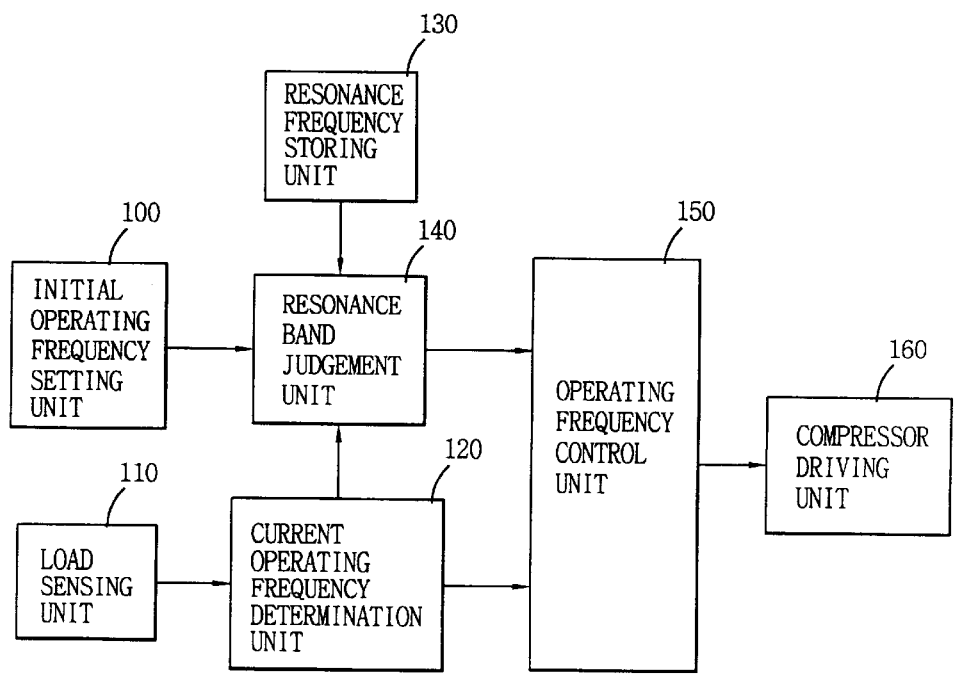
FIG. 6 is a block diagram showing the construction of a resonance frequency controller of an inverter refrigerator according to the present invention.

FIG. 6 is a block diagram showing the construction of a resonance frequency controller of an inverter refrigerator according to the present invention. As shown in FIG. 6, the resonant frequency controller includes a temperature sensing unit 110 for sensing a load of a refrigerator by sensing a temperature of the refrigerator or a compressor, a desired operating frequency determination unit 120 for determining the desired operating frequency by checking the state of the refrigerator based on the temperature sensed by the temperature sensing unit, a resonance frequency storing unit 130 for storing a set resonance frequency, an initial operating frequency selling unit 100 for setting a first operating frequency during an initial start-up of the compressor, a resonance band judgement unit 140 for judging whether a set resonance frequency band(hereinafter, called as a "resonance band") exists between the first frequency during the initial start-up and the desired operating frequency, which are inputted from the initial operating frequency setting unit 100 and the desired operating frequency determination unit 120, an operating frequency control unit 150 for varying the operating frequency determined by the desired operating frequency determination unit according to a result of the judgement by the resonance band judgement unit and outputting the varied operating frequency, and a compressor driving unit for driving the compressor in accordance with the operating frequency outputted from the operating frequency control unit.

The operation of the present invention will be described with reference to FIGS. 6 and 7.

Figure 7:
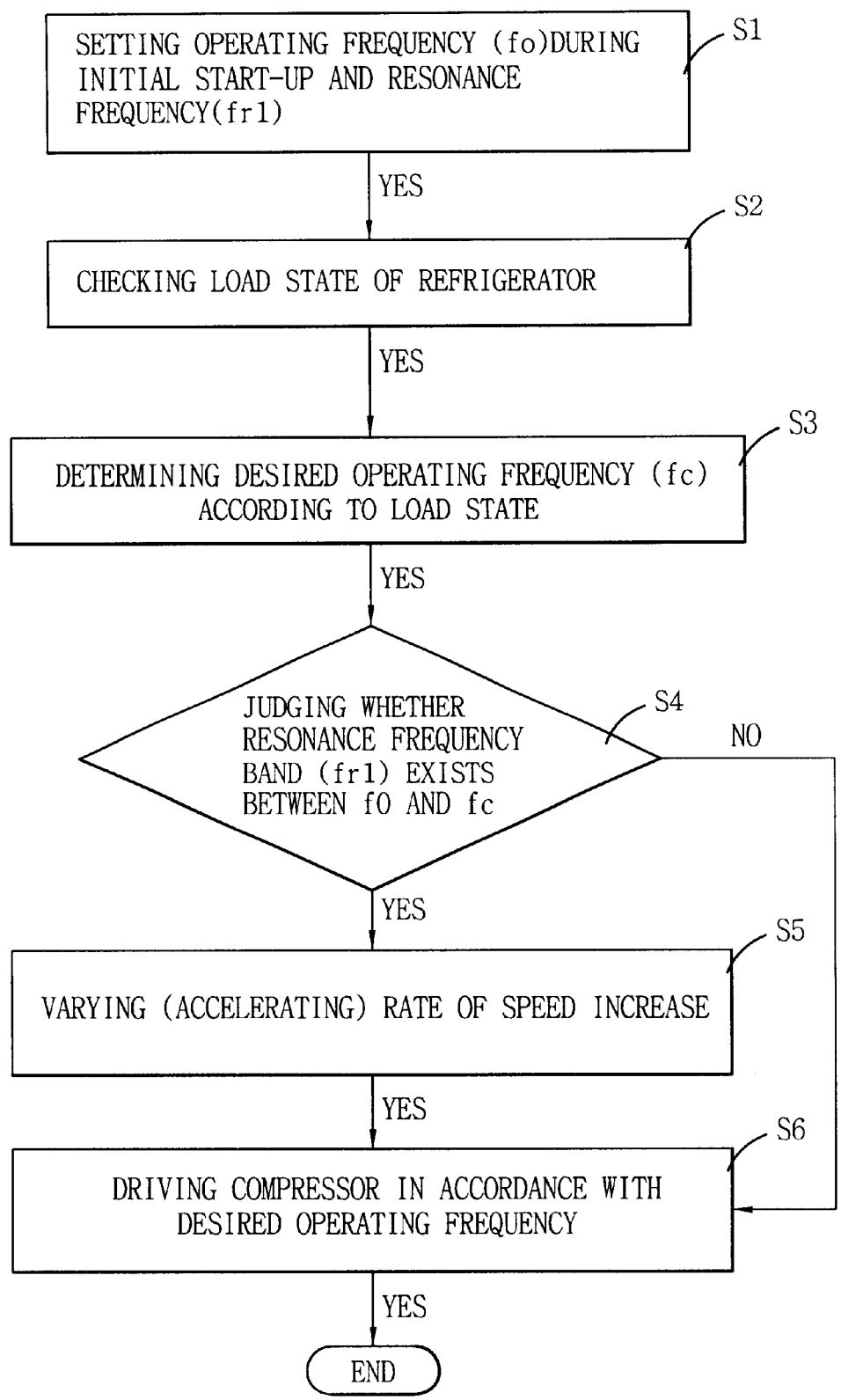
FIG. 7 is a flow chart of a resonance frequency control method according to the present invention.

FIG. 7 is an flow chart according to the present invention. As shown in FIG. 7, when initially starting the refrigerator, the initial operating setting unit 100 sets a first operating frequency $f_0$, and the resonance frequency storing unit 130 sets an resonance frequency band $f_{r1}$ (S1). Then, the temperature sensing unit 110 senses the temperature(load) of the refrigerator or the compressor(not shown) (S2) and outputs the sensed temperature. The output is inputted into the desired operating determination unit 120. The desired operating frequency $f_c$ is determined by checking the load state of the refrigerator according to the sensed temperature T1 (S3). Next, it is judged whether a resonance frequency band $f_{r1}$ exists between the operating frequency($f_0$: e.g., 55 Hz) during the initial start-up and the desired operating frequency($f_c$: e.g., 49 Hz) (S4). As a result, if a resonance frequency band fr1 exists between the first operating frequency $f_0$ during the initial start-up and the desired operating frequency $f_c$, a variable speed setting unit(not shown) of an operating frequency control unit 150 varies the rate at which the operating frequency changes (S5) to thereby deviate the operating frequency $f_c$ from the resonance band, rapidly (e.g., 37 Hz) to reduce the time that the operating frequency is within the resonance frequency band. As a result of the step (S4), if the resonance frequency band $f_{r1}$ is not between the first operating frequency $f_0$ during the initial start-up and the desired operating frequency $f_c$ the compressor is driven and a terminating routine is executed (S6).

As described in the above, the apparatus and method for controlling the resonance frequency of an inverter refrigerator according to the present invention provide an effect of minimizing noises and vibrations generated due to the resonance by controlling the resonance frequency, so that the compressor is not operated in the resonance frequency band.

What is claimed is:

1. An apparatus for controlling a compressor of an inverter refrigerator, comprising:

means for sensing a temperature of the refrigerator;

means for determining a desired operating frequency of the compressor based upon the sensed interior temperature of the refrigerator;

means for judging whether a resonance frequency band exists between a first operating frequency of the compressor and the desired operating frequency; and control means for controlling the operating frequency of the compressor, wherein the control means will vary the rate at which the operating frequency changes as the operating frequency changes from the first operating frequency to the desired operating frequency if the judging means determines that a resonance frequency band exists between the first operating frequency and the desired operating frequency in order to reduce the time the operating frequency is within the resonance frequency band.

2. The apparatus of claim 1, wherein the control means maintains a substantially constant rate of change of the operating frequency as the operating frequency changes from the first operating frequency to the desired operating frequency if no resonance frequency band exists between the first operating frequency and the desired operating frequency.

3. The apparatus of claim 1, wherein the control means increases the rate of change of the operating frequency as the operating frequency passes through a resonance frequency band.

4. The apparatus of claim 1, wherein the temperature sensing means senses the load of the refrigerator by sensing a temperature of the compressor or an internal storage cavity of the refrigerator.

5. An apparatus for controlling a compressor of an inverter refrigerator comprising:
   a temperature sensing unit;
   a desired operating frequency determination unit which determines a desired operating frequency based on an output of the temperature sensing unit;
   a resonance band judging unit configured to determine whether a resonance frequency band exists between a first operating frequency of the compressor and the desired operating frequency; and
   an operating frequency control unit configured to vary the rate at which the operating frequency changes based on an output of the resonance band judging unit.

6. The apparatus of claim 5, wherein the operating frequency control unit is also configured to hold the rate of change of the operating frequency substantially constant when a resonance frequency band does not exist between the first operating frequency and the desired operating frequency.

7. The apparatus of claim 5, wherein the operating frequency control unit is configured to increase the rate of change of the operating frequency as the operating frequency passes through a resonance frequency band.

8. The apparatus of claim 5, wherein the temperature sensing unit is a temperature sensor configured to determine a temperature of either the compressor or an internal storage cavity of the refrigerator.

9. A method for controlling a compressor of an inverter refrigerator, comprising:
   sensing a temperature of the refrigerator;
   determining a desired operating frequency according to the sensed temperature;
   varying the operating frequency of the compressor to compensate for the sensed temperature if a first operating frequency is not equal to the desired operating frequency, wherein the rate of change of the operating frequency is increased as the operating frequency passes through a resonance band.

10. The method of claim 9, wherein the operating frequency is varied at a substantially constant rate when the operating frequency is not within a resonance frequency band.

11. The method of claim 9, wherein a rate of change of the operating frequency increases when the operating frequency passes through a resonance frequency band.

12. The method of claim 9, wherein the sensing step comprises sensing a temperature of the compressor or an internal storage compartment of the refrigerator.

13. An apparatus for controlling a compressor of an inverter refrigerator, comprising:
   means for sensing a temperature of a refrigerator; and
   control means for controlling an operating frequency of the compressor based on the sensed temperature, wherein the control means minimizes the time the compressor operates in a resonance frequency band by varying a rate of change of the compressor frequency.

14. The apparatus of claim 13, wherein the control means further comprises means for determining a desired operating frequency, wherein the control means is configured to vary the operating frequency of the compressor between a first operating frequency and the desired operating frequency.

15. The apparatus of claim 14, wherein the control means is configured to vary the rate at which the operating frequency varies as the operating frequency changes from the first operating frequency to the desired operating frequency.

16. The apparatus of claim 15, wherein the control means increases the rate at which the operating frequency changes when the operating frequency is within a resonance frequency band.

17. A method for controlling a compressor of an inverter refrigerator, comprising:
   changing an operating frequency of the compressor from a first operating frequency to a second operating frequency; and
   varying a rate of change of the compressor operating frequency when the operating frequency is within a resonance frequency band.

18. The method of claim 17, wherein the rate at which the operating frequency varies increases when the operating frequency is within a resonance frequency band.

* * * * *